Aug. 11, 1964  H. E. TENDLER  3,143,915
ANCHOR BOLTS
Filed Oct. 27, 1961
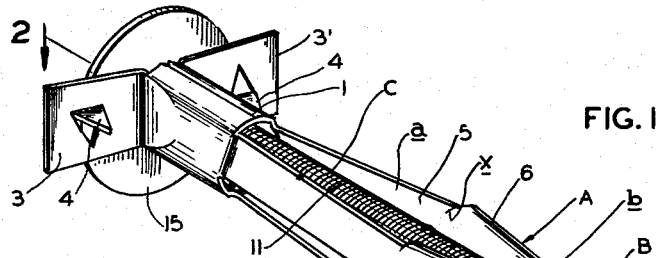
FIG. 1
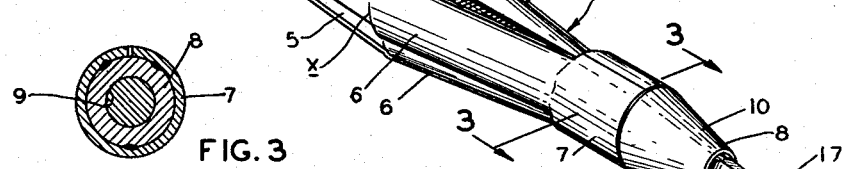
FIG. 3   FIG. 2
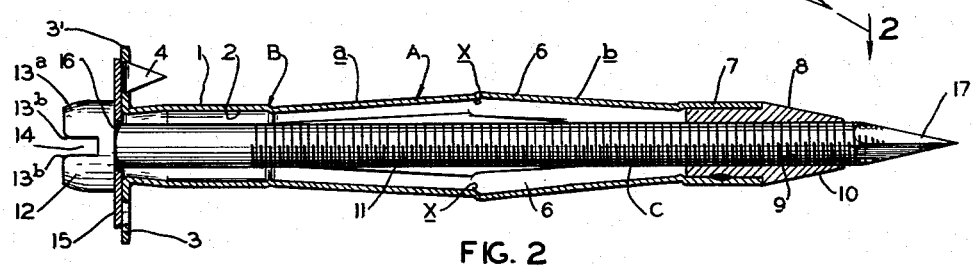
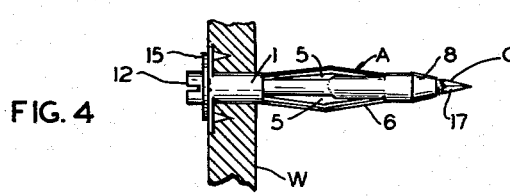
FIG. 4
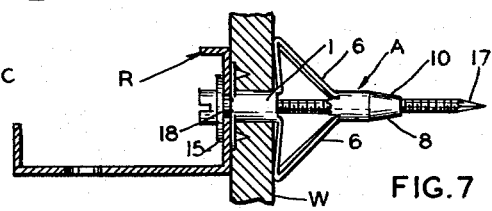
FIG. 7
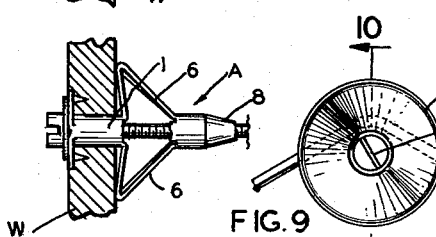
FIG. 5
FIG. 9
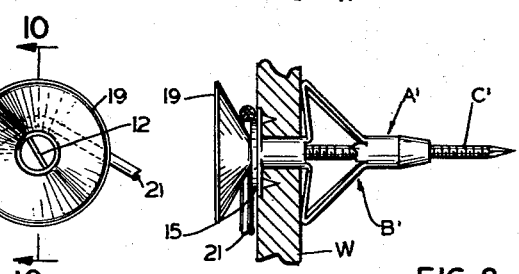
FIG. 8
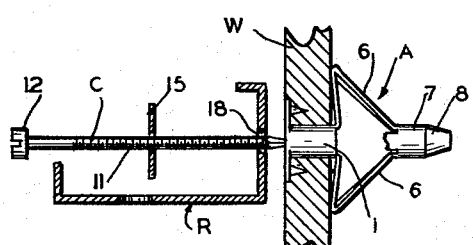
FIG. 6
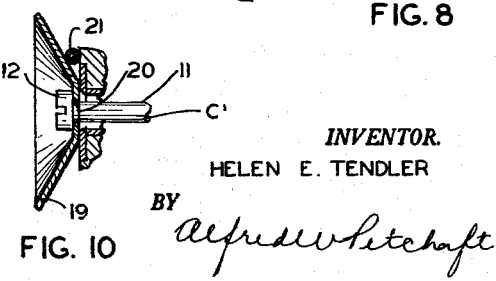
FIG. 10
*INVENTOR.*
HELEN E. TENDLER
BY
Alfred Whitchaft
ATTORNEY

# 3,143,915
ANCHOR BOLTS
Helen E. Tendler, St. Louis County, Mo., assignor to Anton Tendler, doing business as Vic-Ton Tool & Machine Co., St. Louis, Mo.
Filed Oct. 27, 1961, Ser. No. 148,074
3 Claims. (Cl. 85—71)

This invention relates in general to expansion fasteners and, more particularly, to an improved type of anchor bolt designed for piercing a wall or other similar structure, and becoming securely seated therein.

It is often necessary to fasten picture frames, shelf-brackets, hanger-brackets, and the like to walls or other similar supportive structures, in which a nail or conventional wood-screw will not hold securely or will not support the weight of some particular load. Under such conditions, it is desirable to install a so-called anchor bolt, but devices of this type ordinarily require the drilling of a large hole through which the shank and anchor sleeve may freely pass. The drilling of such a hole is not only time-consuming but often requires the use of tools which are not immediately available to the average person. Moreover, even when the user has a drill suitable for such work, it requires a reasonable degree of skill to avoid cracking the plaster or otherwise damaging the material into which the anchor bolt is being inserted.

It is, therefore, the primary object of the present invention to provide an anchor bolt which is capable of being driven into the supporting structure such as a wall or the like and being rigidly secured therein.

It is another object of the present invention to provide an anchor bolt of the type stated that can be easily and rapidly driven directly into the supporting structure without first boring a hole therein.

It is a further object of the present invention to provide an anchor bolt of the type stated which is simple in construction, and economical in cost.

It is also an object of the present invention to provide an anchor bolt of the type stated that is sufficiently strong to withstand deformation upon being driven into a supporting structure such as plasterboard, plywood, drywall construction, or the like, and will not damage the surrounding area of the supporting structure while being driven therein.

With the above and other objects in view, my invention resides in the novel features of form, construction, arrangement, and combination of parts presently described and pointed out in the claims.

In the accompanying drawing (1 sheet)—

FIG. 1 is a perspective view of an anchor bolt constructed in accordance with and embodying the present invention;

FIGS. 2 and 3 are sectional views taken along lines 2—2 and 3—3, respectively, of FIG. 1;

FIG. 4 is a fragmentary sectional view of a wall with an anchor bolt of the present invention driven therein;

FIG. 5 is a fragmentary sectional view of a wall with the anchor sleeve drawn against the inner surface of the wall in permanently installed position;

FIG. 6 is an exploded view of the anchor bolt and an element to be mounted on the wall thereby;

FIG. 7 is a fragmentary sectional view of the wall with the anchor bolt and supported element mounted thereon in completely installed position;

FIG. 8 is a side elevational view partly broken away and in section of a modified form of the present invention;

FIG. 9 is a front elevational view of the modified form of the invention; and

FIG. 10 is a sectional view taken along line 10—10 of FIG. 9.

Referring now in more detail and by reference characters to the drawings which illustrate practical embodiments of the present invention, A designates an anchor bolt which comprises an anchor sleeve B having an outer tubular collar-portion 1 which is provided with a central bore 2. The collar 1 is integrally provided at its outer end with a pair of radially extending wall engaging flanges 3, 3', each of which is provided with inwardly struck wall penetrating prongs 4, reference being made to FIG. 1. The collar 1 is also provided intermediate its ends with three circumferentially spaced axially extending slits 5 thereby defining three axially extending bands 6 which are bowed outwardly at their center portions so that each band consists of two angularly inclined sections a, b, which are connected at the apex by a preformed indentation x. It should be noted, in this connection, that the band sections a are shorter in axial length and narrower in circumferential width than the band sections b, all as best seen in FIG. 2 and for purposes presently more fully appearing. The bands 6 are integrally joined at their inner ends by a second tubular collar-portion 7 and spot-welded therein is a cylindrical nut 8 having a central internally threaded bore 9 and an external frusto-conical or tapered nose-portion 10, which, in effect, forms a continuation of the taper of the angular band sections b, and thereby aids in driving the anchor bolt A into a wall or other permanent structure W, as will presently more fully appear.

Extending axially through the collar-portion 1 is a bolt C which is provided with a threaded shank 11 and a diametrically enlarged head 12. The head 12 is formed with a rounded edge 13$^a$ around its circumference and chamfered edges 13$^b$ along the outer margins of the nick 14 to prevent deformation thereof when struck with a hammer or similar driving means. The nick 14 is, of course, adapted for accommodating the usual screwdriver or similar tool (not shown). A conventional washer 15 having a central aperture 16 is mounted on the shank 11 and interposed between the bolt head 12 and the outer surface of the wall-engaging flanges 3, 3'. It is to be noted that the threads of the threaded shank 11 are designed for matching engagement with the internally threaded bore 9 of the nut 8. The outer or penetrating end of the screw bolt C is sharpened in the provision of an elongated needle-like wall piercing point 17. It can be seen from FIGS. 1 and 2 that the piercing point 17 extends through the nut 8 and forms part of the wall-penetrating taper formed by the surfaces of the nose-portion 10 and the band sections b.

In use, the anchor bolt A, in the assembled form as shown in FIG. 1, can be readily driven into a wall or any suitable supporting structure W very much in the manner of a nail until the prongs 4 pierce the outer surface of the wall W and the flanges 3, 3', are flush so as to hold the anchor sleeve B within the wall W and to prevent turning about its longitudinal axis, thus assuming the position as shown in FIG. 4.

The bolt C is thereupon rotated within the collar 1 and nut 8 in such manner as to urge the nut 8 axially along the threaded shank 11. The nut 8 being rigidly secured to the collar portion 7 will also be prevented from turning about its axis. The axial movement of the nut 8 will force the relatively thin bands 6 to bend outwardly so as to assume the position shown in FIG. 5 in the form of radially projecting somewhat triangular wings which retentively engage the inner surface of the wall W, thereby holding the anchor sleeve B securely within the wall W. By reason of the fact that the band sections a are both narrower in circumferential width and shorter in axial length than the band sections b, the axial force which causes the collar portion 7 to be drawn axially toward the collar portion 1 will deform the bands 6 about the indentations x and cause the latter to form apices which bear against the interior face of the wall W at points which are spaced radially outwardly from the axial line of the sleeve B, thereby applying an extremely efficient sleeve-retentive force to the entire structure. The bolt C can then be turned in the opposite direction, unthreaded from the nut 8, and thereupon removed from the anchor sleeve B leaving the latter firmly installed within the wall W.

The bolt C may then be inserted through the aperture 18 of a conventional wall-mounted element such as the bracket R. It will, of course, be understood that the bracket R is shown only for purposes of illustration and it is obvious that any other type of wall-mounted element may be similarly employed. Thereupon, the bolt C is reinserted into the bore 2 of the collar-portion 1 and nut 8. For this purpose the point 17 serves as a "finder" and readily guides the bolt C into the threaded bore 9 of the nut 8. The bolt C is then tightened in any convenient manner so as to be rigidly seated within the anchor sleeve B, substantially as shown in FIG. 7.

It is possible to provide a modified form of an anchor bolt A' substantially as shown in FIGS. 8–10 that is substantially identical with the previously described anchor bolt A. The anchor bolt A' similarly comprises an anchor sleeve B' and a bolt C' slidably disposed in the anchor sleeve B' which are identical with the previously described anchor sleeve B and bolt C, respectively, except that a frusto-conical collar 19 having an aperture 20 is mounted on the shank 11 of the bolt C' and interposed between the washer 15 and the head 12 to form a picture-hanging device. The head 12 of the screw bolt C' will fit within the conically shaped portion of the collar 19 whereupon the collar 19 will be rigidly seated against the outer surface of the washer 15 which is seated against the outer surface of the wall W. When fully installed, a picture-wire 21 may be looped over and partially around the collar 19, substantially as shown in FIG. 10.

It should be understood that changes and modifications in the form, construction, arrangement, and combination of the several parts of the anchor bolts may be made and substituted for those herein shown and described without departing from the nature and principle of my invention.

Having thus described my invention, what I claim and desire to secure by Letters Patent is:

1. An anchor bolt comprising an elongated tubular sleeve formed of malleable metal and including first and second axially spaced collars which are integrally connected by a plurality of axially extending bands, said first collar having a plurality of outwardly extending wall-engaging flanges, wall penetrating prong means integrally formed on each of said flanges and extending toward said second collar, each of said axially extending bands consisting of two angularly inclined relatively straight sections, one of said sections connected to said first collar and the other of said sections connected to said second collar, the point of connection of said two band sections forming a common apex section having a preformed indentation, the band section connected to the second collar having a longer axial length than the band section connected to the first collar, the band section connected to the second collar also having a minimum circumferential width which is greater than the maximum circumferential width of the band section connected to the first collar, an internally threaded nut rigidly and permanently secured within one end of the second collar, said nut having an external convergently tapered end portion projecting axially from the second collar in a direction away from the first collar, and a bolt axially extending through the sleeve, said bolt having a threaded portion adapted for removable engagement with the nut, said bolt being integrally formed with a piercing point having a plurality of flat surfaces so arranged that the lines of intersection between adjacent flat surfaces are approximately continuations of the tapered end portions of the nut, said piercing point being adapted to extend through and project beyond the nut, whereby the bolt, nut and sleeve can be driven as a single unit through an initially imperforate wall-forming element such as wall-board, plaster, plywood or the like.

2. An anchor bolt as defined in claim 1 in which the nut is welded within the second collar.

3. An anchor bolt comprising an elongated tubular sleeve formed of malleable metal and including first and second axially spaced collars which are integrally connected by a plurality of axially extending bands, said first collar having a plurality of outwardly extending wall-engaging flanges, wall penetrating means formed on each of said flanges and extending toward said second collar, each of said axially extending bands consisting of two angularly inclined relatively straight sections, one of said sections connected to said first collar and the other of said sections connected to said second collar, the point of connection of said two band sections forming a common apex section having a preformed indentation, the band section connected to the second collar having a longer axial length than the band section connected to the first collar, the band section connected to the second collar also having a minimum circumferential width which is greater than the maximum circumferential width of the band section connected to the first collar, an internally threaded nut rigidly and permanently secured within one end of the second collar, said nut having an external convergently tapered end portion projecting axially from the second collar in a direction away from the first collar, and a bolt axially extending through the sleeve, said bolt having a threaded portion adapted for removable engagement with the nut, said bolt being integrally formed with a piercing point having a plurality of flat surfaces so arranged that the lines of intersection between adjacent flat surfaces are approximately continuations of the tapered end portions of the nut, said piercing point being adapted to extend through and project beyond the nut whereby the bolt, nut, and sleeve can be driven as a single unit through an initially imperforate wall-forming element such as wall-board, plaster, plywood, or the like.

References Cited in the file of this patent

UNITED STATES PATENTS

| 2,313,616 | Bowersox | Mar. 9, 1943 |
| 2,559,281 | Croessant | July 3, 1951 |
| 2,610,013 | Gibson | Sept. 9, 1952 |
| 2,913,953 | Tendler | Nov. 24, 1959 |
| 2,918,814 | Poupitch | Dec. 29, 1959 |

FOREIGN PATENTS

| 212,600 | Australia | July 19, 1956 |
| 4,444 of 1906 | Great Britain | Feb. 23, 1906 |
| 512,884 | Italy | Feb. 2, 1955 |